United States Patent
Kim et al.

(10) Patent No.: US 10,439,740 B2
(45) Date of Patent: Oct. 8, 2019

(54) COMMUNICATION CHANNEL CALIBRATION USING FEEDBACK

(71) Applicant: Rambus Inc., Sunnyvale, CA (US)

(72) Inventors: Jun Kim, Los Altos Hills, CA (US); Wayne S. Richardson, Saratoga, CA (US); Glenn Chiu, San Bruno, CA (US)

(73) Assignee: Rambus Inc., Sunnyvale, CA (US)

( * ) Notice: Subject to any disclaimer, the term of this patent is extended or adjusted under 35 U.S.C. 154(b) by 144 days.

(21) Appl. No.: 15/652,047

(22) Filed: Jul. 17, 2017

(65) Prior Publication Data

US 2018/0006737 A1 Jan. 4, 2018

Related U.S. Application Data

(60) Continuation of application No. 14/861,573, filed on Sep. 22, 2015, now Pat. No. 9,735,898, which is a
(Continued)

(51) Int. Cl.
*G06F 19/00* (2018.01)
*H04B 17/11* (2015.01)
(Continued)

(52) U.S. Cl.
CPC ............ *H04B 17/11* (2015.01); *H04L 5/1438* (2013.01); *H04L 25/03343* (2013.01); *H04L 2025/03802* (2013.01)

(58) Field of Classification Search
CPC . G06F 13/4221; G06F 13/4282; Y02D 10/14; Y02D 10/151
(Continued)

(56) References Cited

U.S. PATENT DOCUMENTS 3,155,102 A 11/1964 Niederer, Jr. et al.
3,638,121 A 1/1972 Spilker, Jr.
(Continued)

FOREIGN PATENT DOCUMENTS

DE 4428548 2/1996
EP 1115202 A1 7/2001
JP 2000-035831 A 2/2000

OTHER PUBLICATIONS

"Draft Standard for a High-Speed Memory Interface (SyncLink)," Draft 0.99 IEEE P1596.7-199X, pp. 1-56 (1996), Microprocessor and Microcomputer Standards Subcommittee of the IEEE Computer Society, 66 pages.
(Continued)

*Primary Examiner* — Edward Raymond
(74) *Attorney, Agent, or Firm* — Lance Kreisman; Peninsula Patent Group

(57) ABSTRACT

A method for calibrating a communication channel coupling first and second components includes transmitting a data signal from the first component to the second component on the communication channel, and sensing a characteristic, such as phase, of the data signal on the second component. Information about the sensed characteristic is fed back to the first component using an auxiliary channel. An adjustable parameter, such as phase, for the transmitter is adjusted on the first component in response to the information. Also, a characteristic of a data signal received from the transmitter on the second component is sensed and used to adjust an adjustable parameter for the receiver on the first component.

20 Claims, 6 Drawing Sheets

Related U.S. Application Data continuation of application No. 13/399,194, filed on Feb. 17, 2012, now Pat. No. 9,172,521, which is a continuation of application No. 12/360,029, filed on Jan. 26, 2009, now Pat. No. 8,121,803, which is a division of application No. 10/864,897, filed on Jun. 9, 2004, now Pat. No. 7,516,029.

(51) Int. Cl.
*H04L 5/14* (2006.01)
*H04L 25/03* (2006.01)

(58) Field of Classification Search
USPC .................. 702/69, 64–67, 182–185, 188
See application file for complete search history.

(56) References Cited

U.S. PATENT DOCUMENTS

| | | | |
|---|---|---|---|
| 3,872,325 A | 3/1975 | Adams et al. |
| 3,922,491 A | 11/1975 | Bjork et al. |
| 4,384,354 A | 5/1983 | Crawford et al. |
| 4,648,133 A | 3/1987 | Vilnrotter |
| 5,111,208 A | 5/1992 | Lopez |
| 5,122,978 A | 6/1992 | Merrill |
| 5,243,626 A | 9/1993 | Devon et al. |
| 5,436,908 A | 7/1995 | Fluker et al. |
| 5,485,490 A | 1/1996 | Leung et al. |
| 5,511,091 A | 4/1996 | Saito |
| 5,523,760 A | 6/1996 | McEwan |
| 5,548,146 A | 8/1996 | Kuroda et al. |
| 5,554,945 A | 9/1996 | Lee et al. |
| 5,621,913 A | 4/1997 | Tuttle et al. |
| 5,742,798 A | 4/1998 | Goldrian |
| 5,859,881 A | 1/1999 | Ferraiolo et al. |
| 5,969,631 A | 10/1999 | Ammler et al. |
| 5,978,578 A | 11/1999 | Azarya et al. |
| 6,034,573 A | 3/2000 | Alderton |
| 6,047,346 A | 4/2000 | Lau et al. |
| 6,163,570 A | 12/2000 | Olafsson |
| 6,173,345 B1 | 1/2001 | Stevens |
| 6,218,842 B1 | 4/2001 | Bittar et al. |
| 6,219,384 B1 | 4/2001 | Kliza et al. |
| 6,282,210 B1 | 8/2001 | Rapport et al. |
| 6,321,282 B1 | 11/2001 | Horowitz et al. |
| 6,359,923 B1 | 3/2002 | Agee et al. |
| 6,359,931 B1 | 3/2002 | Perino et al. |
| 6,369,652 B1 | 4/2002 | Nguyen et al. |
| 6,377,640 B2 | 4/2002 | Trans |
| 6,380,644 B1 | 4/2002 | Iliasevitch |
| 6,396,329 B1 | 5/2002 | Zerbe |
| 6,421,389 B1 | 7/2002 | Jett et al. |
| 6,434,081 B1 | 8/2002 | Johnson et al. |
| 6,442,644 B1 | 8/2002 | Gustavson et al. |
| 6,448,815 B1 | 9/2002 | Talbot et al. |
| 6,463,392 B1 | 10/2002 | Nygaard et al. |
| 6,469,555 B1 | 10/2002 | Lau et al. |
| 6,473,439 B1 | 10/2002 | Zerbe et al. |
| 6,484,232 B2 | 11/2002 | Olarig et al. |
| 6,489,893 B1 | 12/2002 | Richards et al. |
| 6,496,911 B1 | 12/2002 | Dixon et al. |
| 6,510,503 B2 | 1/2003 | Gillingham et al. |
| 6,539,072 B1 | 3/2003 | Donnelly et al. |
| 6,545,997 B1 | 4/2003 | Bohnke et al. |
| 6,556,934 B2 | 4/2003 | Higashide |
| 6,560,716 B1 | 5/2003 | Gasparik et al. |
| 6,578,153 B1 | 6/2003 | Sankey et al. |
| 6,606,350 B2 | 8/2003 | Dress, Jr. et al. |
| 6,606,576 B2 | 8/2003 | Sessions |
| 6,643,787 B1 | 11/2003 | Zerbe et al. |
| 6,657,468 B1 | 12/2003 | Best et al. |
| 6,662,305 B1 | 12/2003 | Salmon et al. |
| 6,690,741 B1 | 2/2004 | Larrick, Jr. et al. |
| 6,717,992 B2 | 4/2004 | Cowie et al. |
| 6,889,357 B1 | 5/2005 | Keeth et al. |
| 6,920,540 B2 | 7/2005 | Hampel et al. |
| 7,099,424 B1 | 8/2006 | Chang et al. |
| 2001/0007430 A1 | 7/2001 | Goodell |
| 2001/0048382 A1 | 12/2001 | Low et al. |
| 2001/0053175 A1 | 12/2001 | Hoctor et al. |
| 2001/0056332 A1 | 12/2001 | Abrosimov et al. |
| 2002/0072870 A1 | 6/2002 | Adam et al. |
| 2002/0138224 A1 | 9/2002 | Sessions |
| 2002/0149824 A1 | 10/2002 | Beaulieu et al. |
| 2003/0026399 A1 | 2/2003 | Carlson |
| 2003/0063597 A1 | 4/2003 | Suzuki |
| 2003/0112031 A1 | 6/2003 | Agrawal |
| 2003/0117864 A1 | 6/2003 | Hampel et al. |
| 2003/0146800 A1 | 8/2003 | Dvorak |
| 2003/0149991 A1 | 8/2003 | Reidhead et al. |
| 2003/0198212 A1 | 10/2003 | Hoctor et al. |
| 2003/0198308 A1 | 10/2003 | Hoctor et al. |
| 2004/0032354 A1 | 2/2004 | Knobel et al. |
| 2004/0057500 A1 | 3/2004 | Balachandran et al. |
| 2004/0133390 A1 | 7/2004 | Osorio et al. |
| 2004/0196089 A1 | 10/2004 | O'Donnell et al. |
| 2004/0217881 A1 | 11/2004 | Pedyash et al. |
| 2004/0244049 A1 | 12/2004 | Hahin et al. |
| 2005/0163202 A1 | 7/2005 | Hampel et al. |
| 2009/0270037 A1 | 10/2009 | Ikeda et al. |
| 2013/0083611 A1* | 4/2013 | Ware .................. G11C 11/4072 365/191 |

OTHER PUBLICATIONS

Banu et al., "TA 6.4: A 660Mb/s CMOS Clock Recovery Circuit with Instantaneous Locking for NRZ Data and Burst-Mode Transmission," IEEE International Solid State Circuits Conference, 1993, pp. 102-103, 270, 4 pages.

Cerisola et al., "CORD—a WDM Optical Network: Control Mechanism Using Subcarrier Multiplexing and Novel Synchronization Solutions," 1995 IEEE International Conference, vol. 1, Jun. 18-22, 1995, pp. 261-265, 6 pages.

Chang et al., "A 2 Gb/s Asymmetric Serial Link for High-Bandwidth Packet Switches," Hot Interconnects V, Stanford University, Aug. 1997, 9 pages.

Chang, Kun-Yung, "Design of a CMOS Asymmetric Serial Link," A Dissertation Submitted to the Department of Electrical Engineering and the Committee on Graduate Studies of Stanford University, Aug. 1999, 133 pages.

Chen et al., "A 1.25Gb/s, 460mW CMOS Transceiver for Serial Data Communication," ISSCC97, Session 15, Serial Data Communications, Paper FP 15.3, pp. 242-243, 465, Feb. 7, 1997, 3 pages.

Dally et al., "Digital Systems Engineering," Cambridge University Press, 1998, pp. 447-449, 3 pages.

Dally et al., "Transmitter Equalization for 4-Gbps Signaling," IEEE Micro, vol. 17, No. 1, Jan./Feb. 1997, pp. 48-56, 9 pages.

Daniele et al., "Principle and Motivations of UWB Technology for High Data Rate WPAN Applications," SOC 2003, 4 pages.

Daniele, Norbert, "Ultra Wide Band Principles and Applications for Wireless Communications," CEA-LETI Annual Review, Jun. 25 and 26, 2002, 23 pages.

EIA/JEDEC Standard No. 8-6 (EIA/JESD8-6), "High Speed Transceiver Logic (HSTL) A 1.5 V Output Buffer Supply Voltage Based Interface Standard for Digital Integrated Circuits," Aug. 1995, 16 pages.

EIA/JEDEC Standard No. 8-B (JESD8-B), "Interface Standard for Nominal 3 V/3.3 V Supply Digital Integrated Circuits," Sep. 1999, 10 pages.

Eldering et al., "Digital Burst Mode Clock Recovery Technique for Fiber-Optic Systems," Journal of Lightwave Technology, vol. 12, No. 2, Feb. 1994, pp. 271-279, 12 pages.

Gillingham et al., "SLDRAM: High Performance Open-Standard Memory," IEEE Micro, Nov./Dec. 1997, pp. 29-39, vol. 17, No. 6, Institute of Electrical and Electronics Engineers, Inc., Los Alamitos, California, 11 pages.

Gillingham, Peter, "SLDRAM Architectural and Functional Overview," SLDRAM Consortium, Aug. 29, 1997, pp. 1-14, 14 pages.

(56) References Cited

OTHER PUBLICATIONS

Hu et al., "A Monolithic 480 Mb/s Parallel AGC/Decision/Clock-Recovery Circuit in 1.2-um CMOS," IEEE Journal of Solid-State Circuits, vol. 28, No. 12, Dec. 1993, pp. 1314-1320, 8 pages.
Intel Corporation, "How to Measure RDRAM System Clock Jitter," Application Note AP-667, Jun. 1999, pp. 1-15, 15 pages.
JEDEC Standard (JESD8-16), "Bus Interconnect Logic (BIC) for 1.2 Volts," Apr. 2004, 15 pages.
Kim et al., "An 800Mbps Multi-Channel CMOS Serial Link with 3x Oversampling," IEEE 1995 Custom Integrated Circuits Conference, pp. 22.7.1-22.7.4, 4 pages.
Lee et al., "TP 15.3: A 90mW 4Gb/s Equalized I/O Circuit with Input Offset Cancellation," IEEE International Solid-State Circuits Conference, Feb. 8, 2000, pp. 252-253, 2 pages.
Lewis, Dave, "Easy-to-Use LVDS Serdes for the Serdes Neophyte," National Semiconductor, Jun. 16, 2003, 5 pages.
Nakamura et al., "A 6 Gbps CMOS Phase Detecting DEMUX Module Using Half-Frequency Clock," 1998 Symposium on VLSI Circuits Digest of Technical Papers, pp. 196-197, 2 pages.
Nakase et al., "Source-Synchronization and Timing Vernier Techniques for 1.2 GB/s SLDRAM Interface," IEEE Journal of Solid-State Circuits, vol. 34, No. 4, Apr. 1999, pp. 494-501, 8 pages.
Paris et al., "WP 24.3: A 800 MB/s 72 Mb SLDRAM with Digitally-Calibrated DLL," ISSCC, 0-7803-5129-0/99, Slide Supplement, IEEE, 1999, 10 pages.
Poulton et al., "A Tracking Clock Recovery Receiver for 4Gb/s Signaling," Hot Interconnects '97, Aug. 21-23, 1997, Palo Alto, CA, pp. 1-13, 14 pages.
Rambus Inc., "Direct Rambus Long Channel Design Guide," 2000, 48 pages.
Rambus Inc., "Direct Rambus Short Channel Layout Guide," Version 0.95, Aug. 2001, 52 pages.
Rambus, Inc. "RDRAM Direct Rambus Clock Generator," Apr. 2002, 22 pages.
RaSer™ X Product Brief, "Highly Flexible 10 Gbps Backplane Serial Link Interface," Copyright 2003, Rambus, Inc. 2 pages.
RDRAM® Overview, "High Performance Memory Interface Solution," Copyright 2003, Rambus, Inc. 4 pages.
Redwood Technology Brief, "High Performance Parallel Bus Interface Technology," Copyright 2003, Rambus, Inc. 2 pages.
SLDRAM Inc., "SLD4M18DR400 4 MEG X 18 SLDRAM: 400 Mb/s/pin SLDRAM 4 M × 18 SLDRAM Pipelined Eight Bank, 2.5 V Operation," Jul. 9, 1998, 69 pages.
U.S. Appl. No. 09/941,079, filed Aug. 28, 2001 entitled "Clock Data Recovery with Selectable Phase Control Input," 55 pages.
U.S. Appl. No. 10/278,708, filed Oct. 22, 2002, entitled "Phase Adjustment Apparatus and Method for a Memory Device Signaling System," 153 pages.
U.S. Appl. No. 10/278,478, filed Oct. 22, 2002 entitled "Timing Calibration Apparatus and Method for Memory Device Signaling System," 196 pages.
Widmer et al., "Single-Chip 4×500-MBd CMOS Transceiver," IEEE Journal of Solid-State Circuits, vol. 31, No. 12, Dec. 1996, pp. 2004-2014, 11 pages.
Widmer, et al., "A DC-Balanced, Partitioned-Block, 8B/10B Transmission Code," IBM J. Res. Develop., vol. 27, No. 5, Sep. 1983, pp. 440-451, 12 pages.
Win et al., "Impulse Radio: How It Works," IEEE Communications Letters 2, vol. 2, Feb. 1998, pp. 36-38, 3 pages.
Yang, Chih-Kong Ken, "Design of High-Speed Serial Links in CMOS," Technical Report No. CSL-TR-98-775 Dec. 1998, pp. 1-182, 94 pages.
Yellowstone Technology Brief, "High Performance Memory Interface Technology," Copyright 2003, Rambus, Inc. 2 pages.
Zerbe, Jared, U.S. Appl. No. 09/776,550, filed Feb. 2, 2001, "Method and Apparatus for Evaluating and Calibrating a Signaling System" Application and Figures as Filed, 62 pages.
Zerbe, Jared, U.S. Appl. No. 09/976,170, filed Oct. 21, 2001, "Method and Apparatus for Evaluating and Optimizing a Signaling System" Application and Figures as Filed, 98 pages.

* cited by examiner

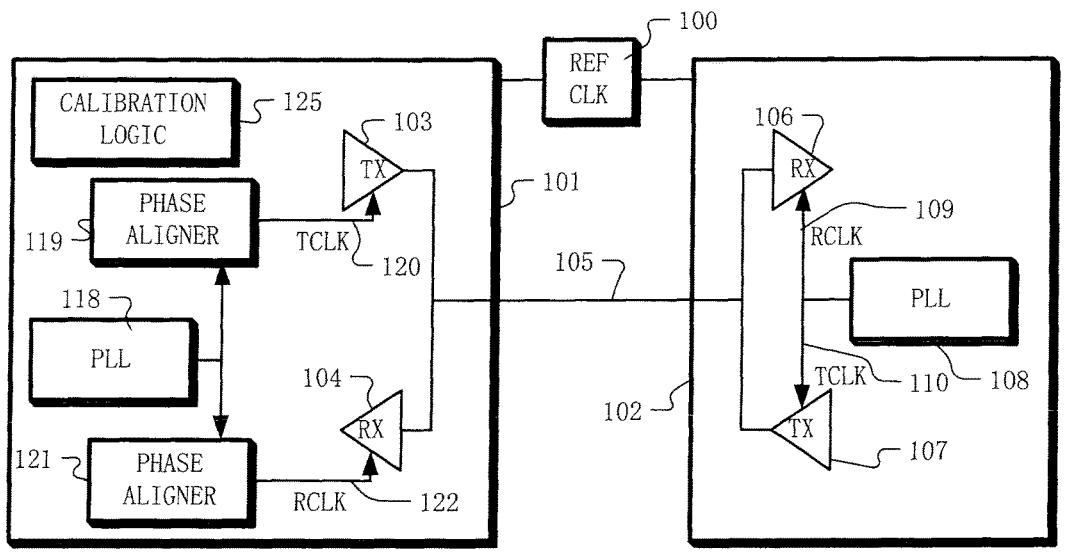
FIG. 1 – PRIOR ART
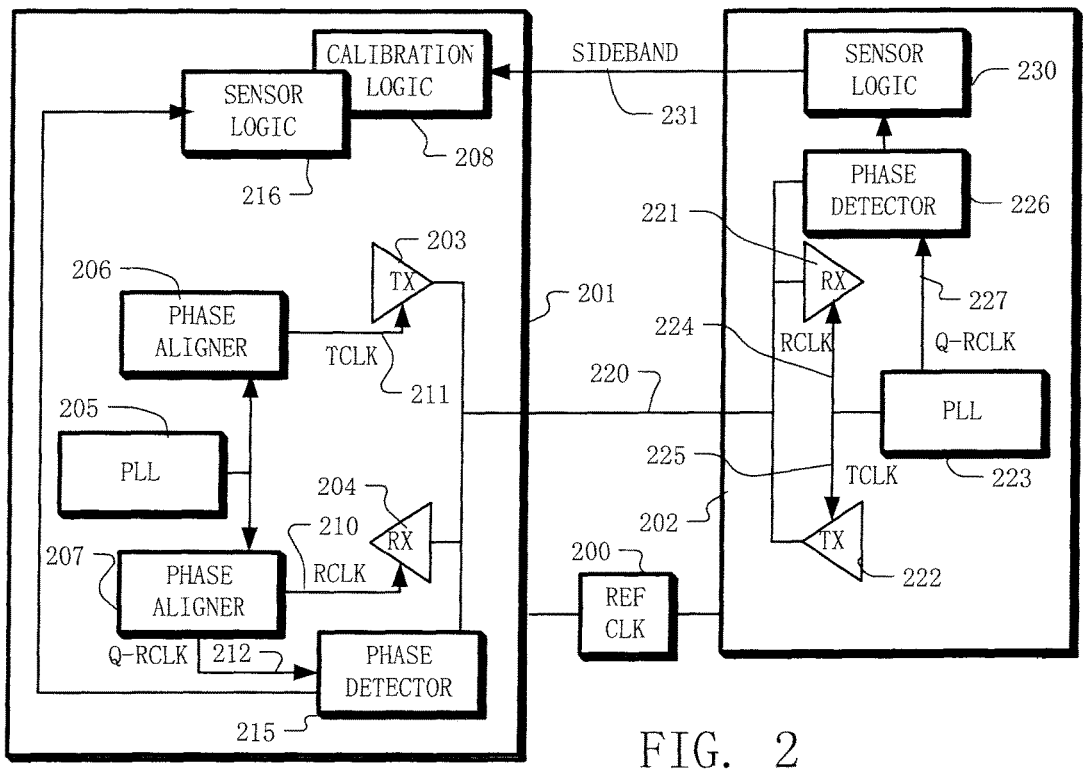
FIG. 2

COMMUNICATION CHANNEL CALIBRATION USING FEEDBACK

RELATED APPLICATIONS/FIELD

This application is a continuation of U.S. patent application Ser. No. 14/861,573, filed Sep. 22, 2015, titled "COMMUNICATION CHANNEL CALIBRATION USING FEEDBACK", which is a continuation of U.S. patent application Ser. No. 13/399,194, filed Feb. 17, 2012, titled "COMMUNICATION CHANNEL CALIBRATION USING FEEDBACK", (now U.S. Pat. No. 9,172,521), which is a continuation of U.S. patent application Ser. No. 12/360,029, filed Jan. 26, 2009 (now U.S. Pat. No. 8,121,803), which is a divisional of U.S. patent application Ser. No. 10/864,897, filed Jun. 9, 2004 (now U.S. Pat. No. 7,516,029), all of which are incorporated by reference in their entireties. The present disclosure relates to calibration of communication channel parameters in systems, including mesochronous systems, in which two (or more) components communicate via an interconnection link; and to calibration to account for drift of conditions related to such parameters during operation of the communication channels.

BACKGROUND OF THE INVENTION

Description of Related Art

In high-speed communication channels, which are operated in a mesochronous manner, typically a reference clock provides frequency and phase information to the two or more components on the link. A transmitter on one component and a receiver on another component each connect to the link. The transmitter and receiver operate in different clock domains, which have an arbitrary (but fixed) phase relationship to the reference clock. The phase relationship between transmitter and receiver is chosen so that the propagation delay seen by a signal wavefront passing from the transmitter to the receiver will not contribute to the timing budget when the signaling rate is determined. Instead, the signaling rate will be determined primarily by the drive window of the transmitter and the sample window of the receiver. The signaling rate will also be affected by a variety of second order effects. This system is clocked in a mesochronous fashion, with the components locked to specific phases relative to the reference clock, and with the drive-timing-point and sample-timing-point of each link fixed to the phase values that maximize the signaling rate.

These fixed phase values may be determined in a number of ways. A sideband link may accompany a communication link (or links), permitting phase information to be passed between transmitter and receiver. Alternatively, an initialization process may be invoked when the system is first given power, and the proper phase values determined by passing calibration information (patterns) across the actual link. Once the drive-timing-point and sample-timing-point of each link has been fixed, the system is permitted to start normal operations.

However, during normal operation, system and environmental conditions will change. Ambient temperature, humidity, component temperature, supply voltages, and reference voltages will drift from their initial values. Many of the circuits in the components will be designed to be insensitive to drift within a specified range, but the drift will need to be considered when setting the upper signaling rate of a link.

As the conditions drift, the optimal timing points of the transmitter and receiver will change. If the timing points remain at their original values, then margin must be added to the timing windows to ensure reliable operation. This margin will reduce the signaling rate of the link.

To improve performance, prior art systems perform a periodic calibration process. The periodic calibration process consumes resources of the communication channel, and therefore reduces the performance of the communication channel for its mission functions.

In many systems, the communication channel is considered asymmetrical, because one side has greater resources for supporting the calibration process than the other. For example, in a memory system, including a memory controller and one or more memory devices such as high-speed DRAMs, the memory controller may include the drivers that are adjustable in response to calibration resources, while the memory devices have lower-cost drivers that cannot be adjusted. In such a system, the memory controller must execute a calibration process considered open-ended, taking into account the asymmetrical nature of the communication channel, without active adjustments of signaling characteristics by the targets of the communication. Such calibration processes can consume greater channel resources than might be required for closed channels. Also, open-ended channels do not gracefully track shifts in clock frequencies of spread spectrum clocks nor do they function well in plesiochronous systems where the frequencies of the respective clocks on the two components are offset by a small delta.

It is desirable to provide techniques for calibration of communication channels which provide more efficient utilization of system resources, without requiring costly circuitry on both sides of the communication channels.

SUMMARY

Disclosed is a method for calibrating elements of a communication channel coupling first and second components, where the first component has a transmitter with an adjustable parameter and the second component has a receiver. The method includes transmitting a data signal from the first component to the second component on the communication channel, and sensing a characteristic of the data signal on the second component. In some example embodiments, the step of sensing a characteristic of the data signal is performed in parallel with sensing the data values carried by the data signal. Information about the sensed characteristic is fed back to the first component using an auxiliary channel (e.g., a "sideband" channel). The adjustable parameter for the transmitter is adjusted on the first component in response to the information. For example, the data signal includes a sequence of data symbols in a carrier having a nominal frequency and phase driven by the transmitter at the first component. A phase detector on the second component senses phase information about the transmitted data signal. The phase information about the transmitted data signal is fed back to the first component, and used to adjust the phase at the transmitter on the first component.

In some embodiments, the first component includes a receiver having an adjustable parameter. The second component includes a transmitter. In these embodiments, the method includes the sensing at the first component, a characteristic of a data signal received from the transmitter on the second component. The adjustable parameter for the receiver is adjusted using the sensed characteristics of the receive data signal. Thus, in one example, a phase detector on the first component senses phase information about the received data signal. The phase information is used to adjust the phase of the receiver on the first component.

In a typical configuration, a calibration routine is executed under the control of the first component to establish operating values for the adjustable parameter of the transmitter, and for the adjustable parameter of the receiver. The calibration routine in representative embodiments comprises transmitting calibration packets between the first and second components, and adjusting the adjustable parameters of the communication channels based on information gathered about the accuracy at which the data patterns in calibration packets are received. In some embodiments, the initial calibration can also be used to establish a starting phase for a reference clock on the second component.

The present invention may be applicable to bus systems in which a plurality of communication channels operate in parallel. In such embodiments, sensors are included on the second component, which sense characteristics of the data signals on the plurality of parallel channels. The information about sensed characteristics of the data signals on the plurality of channels is fed back to the first component, and used for adjusting the adjustable parameters of the transmitters on the first component. In embodiments including receivers on the first component with adjustable parameters, sensors are included on the first component, which sense characteristics of the data signals on the plurality of parallel channels. Information about the sensed characteristics of the data signals is used to adjust the adjustable parameters of the receivers on the first component. Note that there can be one sensor per channel or one sensor for more than one channel where the associated channels behave similarly under varying conditions.

In some embodiments, logic on the second component accumulates information about the sensed characteristic of the data signals on the second component. The accumulated information is used to compose a communication packet. The packet is transmitted to the first component, where the packet is parsed and used for adjusting the adjustable parameter for the transmitter. In embodiments in which the method is applied to bus systems or other parallel sets of communication channels, information about the sensed characteristics of the plurality of parallel channels is accumulated and composed into communication packets. The communication packets carry the information about the sensed characteristic of the channels, as well as identifiers which identify respective communication links for the information. On the first component, the communication packets are parsed and the information about sensed characteristics of the transmitted data signal is applied to the identified channels.

As mentioned above, in one example, the sensed characteristic of the data signal comprises phase of the data signal relative to a reference clock. In other embodiments, the sensed characteristic comprises equalization characteristics of the data signal, such as a combination of amplitude and phase. In yet other embodiments, the sensed characteristic comprises the amplitude of the data signal. The adjustable parameter on the transmitter comprises a drive-timing-point in some embodiments. The adjustable parameter on the receivers comprises a sample-timing-point in some embodiments. The adjustable parameter in yet other embodiments comprises a drive power or equalization coefficients.

The auxiliary channel in some embodiments of the invention comprises a serial link which operates at a frequency much lower than the communication channel subject of the calibration. In one representative embodiment, a scan out port on the second component is used as the port for this auxiliary channel. In yet other embodiments, the auxiliary port uses an input/output pin on the second component which has multiple functions. The communication packets transferred out of the auxiliary port can be directly routed to the first component on the communication channel, routed to a host processor which later provides the information to the first component, or otherwise directed to the first component via direct or indirect connections.

The present invention is also embodied by an apparatus including a plurality of communication channels between first and second components. The first component in this embodiment includes a plurality of first interface circuits connected to corresponding communication channels in the plurality of communication channels. The first interface circuits include transmitters and receivers where at least the transmitters have adjustable parameters that affect characteristics of transmitted data signals. A first port on the first component is included for communication with the second component via an auxiliary channel. Logic is coupled with the port used for a auxiliary channel that reads information received from the second component indicating sensed characteristics of data signals received at the second component. The logic uses the information to adjust the adjustable parameters for the transmitters in the plurality of first interface circuits. The second component includes a plurality of second interface circuits that are connected to corresponding communication channels. The second interface circuits include transmitters and receivers. A plurality of sensors on the second component coupled with corresponding second interface circuits sense characteristics of data signals received at the second interface circuits. The second port on the second component is included for communication with the first component via the auxiliary channel. Logic on the second component is coupled with the plurality of sensors and with the port used for the auxiliary channel. The logic accumulates information about the sensed characteristics of the data signals on the second component, and transmits the information via the auxiliary channel to the first component. The logic that accumulates information about the sensed characteristics on the second component composes communication packets for transmission across the auxiliary channel to the first component. The communication packets carry the sensed information and identifiers of the channels to which the information corresponds.

The sensors may be adapted to sample a minimum number of signal transitions within a given period of time so that signaling characteristics are more accurately reflected in the sensed information sent back to the first component. For example, if the sensor is detecting phase, there needs to be a sufficient number of samples of signal transitions so that the sensors can detect the varying phase of the incoming signal. Since the data stream could theoretically contain a very long data stream with no signal transitions, the signaling protocol should guarantee a minimum number of transitions, potentially in the form of packet headers or markers or the like.

In some embodiments, the logic on the second component processes the accumulated information to some degree. For example, the accumulated information may comprise sets of samples from the sensors which are averaged or otherwise processed. In some embodiments, the accumulated information about a particular channel may be transmitted only if the corresponding set of samples meets the threshold criterion, such as a majority of the samples exceeding a threshold.

In various embodiments, the plurality of sensors comprises phase detectors, amplitude detectors, or other sensors which provide information about data signals received at the second component.

In some embodiments, both the transmitters and receivers on the first interface circuits on the first component have adjustable parameters. A plurality of sensors in this embodiment is provided on the first component which senses characteristics about data signals transmitted by the second component and received at the first component. Information about the sensed characteristics of data signals received at the first component is used for adjustment of the adjustable parameters for the receivers on the plurality of first interface circuits.

The present invention is also embodied by bus system interfaces, where each bus system interface is adapted to behave as either the first component interface, or the second component interface as described above.

In embodiments of the present invention, the first and second components comprise integrated circuits interconnected by high-speed chip-to-chip links on printed circuit boards, or on backplane buses. In some embodiments, the communication channels operate with clock rates greater than one gigahertz. Scalability to almost any data rate on the communication channels may be achieved using a dedicated auxiliary channel for transfer of calibration data.

The present disclosure describes apparatus which may be particularly suitable for high-speed memory systems, including a memory controller and one or more high-speed memory devices such as DRAMs, where the memory controller supports sophisticated logic circuitry and higher cost manufacturing technologies for such logic than is typically available on commodity memory devices.

Another implementation could utilize a more channel resource intensive initial calibration method, and then the present method be utilized provide phase correction updates.

In embodiments where a sensed characteristic is the phase of the data signal, the invention may allow for graceful operation without consuming large amounts of channel resources in plesiochronous systems as well as systems utilizing a spread spectrum clock. The bandwidth of the phase correction provided by the channel calibration is the key metric as to whether such systems can operate optimally, and while an open-ended system would require large amounts of channel resources to provide sufficiently high phase correction bandwidth, the invention can provide such bandwidth without the cost to channel resources. Because of this higher bandwidth, the error due to system and environmental variations can also be further minimized at a lower resource cost versus an open-ended system.

Other aspects and advantages of the present invention can be seen on review of the drawings, the detailed description and the claims, which follow.

BRIEF DESCRIPTION OF THE DRAWINGS

FIG. 1 is a simplified diagram of two components interconnected by a communication channel, according to the prior art, with an asymmetrical channel.

FIG. 2 is a simplified diagram of two components interconnected by a communication channel according to an embodiment of the present invention, with an improved closed-loop channel.

DETAILED DESCRIPTION

Figure 3:
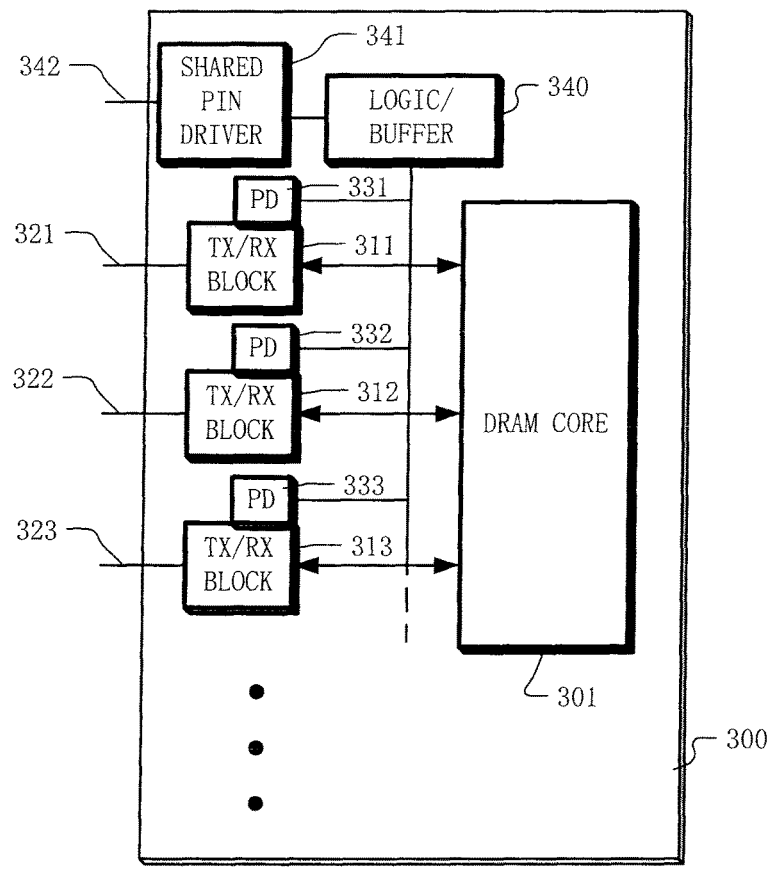
FIG. 3 illustrates a representative embodiment of one of the units on an asymmetrical communication channel according to the present invention, with a plurality of I/O ports.

Example embodiments of the present disclosure include apparatus and methods for calibrating communication elements coupled using a communication channel. For example, the communication elements may include a first component and a second component. The first component having a transmitter with an adjustable parameter and the second component having a receiver. The method includes transmitting a data signal from the first component to the second component on the communication channel, and sensing a characteristic of the data signal on the second component. In some example embodiments, the step of sensing a characteristic of the data signal is performed in parallel with sensing the data values carried by the data signal. Information about the sensed characteristic is fed back to the first component. This information may be fed back to the first component using an auxiliary channel or a variety of other communication methods. For example, a dedicated signal line (e.g. a "sideband" signal line) may be coupled between the first and second components, to convey the sensed characteristic from the second component to the first component. In an embodiment, the sense characteristic may be fed back to the first component using the main communication channel utilizing some method that does not degrade the performance of that main communication channel. For example, the information could be communicated on the main channel only during those times the main communication channel is not being utilized for other purposes. Alternatively, a simultaneous bi-directional signaling approach may be used to allow main communication from the first to second component to occur simultaneously and without degradation with communication of the sensed characteristic from the second to the first component. As another example, a differential signaling approach over differential signal lines may be used for the main communication (either from the first to second component or from the second to first component) while common mode signaling may proceed from the second to first component to feedback the sensed characteristic. Here, common mode signaling indicates a signaling method that represents symbols with the common signal level of the pair of differential signal lines. Note also that "main communication" typically refers to primary or normal operation where data or symbols are communicated from one component to another component. An example of main communication is a memory read or write operation.

The adjustable parameter for the transmitter is adjusted on the first component in response to the information. For example, the data signal includes a sequence of data symbols representing data in a carrier having a nominal frequency and phase driven by the transmitter at the first component. A phase detector on the second component senses phase information about the transmitted data signal. A receiver, which comprises a sensor other than the phase detector in this example, senses the data represented by the data signals. The phase information about the transmitted data signal is fed back to the first component, and used to adjust the phase at the transmitter on the first component. The sensed data is provided to its destination.

A detailed description of embodiments of the present invention is provided with reference to the FIGS. 1-10.

FIG. 1 illustrates an asymmetrical channel according to the prior art. In this example, a mesochronous system is illustrated. In the mesochronous system, a reference clock 100 supplies clock signals to a first component 101 and the second component 102. The first component includes a transmitter 103 and receiver 104 which are connected to a communication link 105. The second component 102 includes a receiver 106 and a transmitter 107 which are connected to the link 105. The clock signals from the reference clock 100 are supplied to a phase locked loop 108 on the second component 102 which sets a phase for a receive clock 109 and a transmit clock 110 on the second component. The operating value for the sample timing point, typically set by the phase of the receive clock 109, and for the drive timing point, typically set by the phase of the transmit clock 110, can be established during initial calibration sequence, or fixed during manufacture for example. The first component 101 likewise includes a phase locked loop 118 which is responsive to the clock signals from the reference clock 100. The phase locked loop output in this example is applied to a phase aligner 119 for the transmit clock 120. The phase aligner 119 adjusts the phase of the transmit clock 120 for the transmitter 103. Also in this example the phase locked loop output is applied to a phase aligner 121 for the receive clock 122, which adjusts the phase of the receive clock 122. Calibration logic 125 on the first component 101 includes the resources for establishing the phase values for the transmit clock 120 and the receive clock 122. For example, the calibration logic 125 first calibrates the receiver 104 to establish reliable reception of data from the second component 102. This can be accomplished by causing the second component 102 to transmit a calibration pattern to the first component, and to adjust the phase of the receive clock 122 until the pattern is successfully received. After calibration of the receiver 104, the transmitter 103 is calibrated by transmitting a calibration pattern to the second component 102, reading and storing the data values of the calibration pattern at the second component 102 using the receiver 104, returning the results to the first component, where logic adjusts the phase of the transmit clock 120 in response to the results. In order to maintain proper phase alignment as the operating environment changes, periodic calibration processes are required which consume resources of the communication channel.

FIG. 2 illustrates an embodiment of the present invention in which a communication channel is established between the first component 201 and the second component 202. In this example, the system is also mesochronous with a reference clock 200 supplying clock signals to the first component 201 and the second component 202. In the illustrated example, the first component includes a transmitter 203 with an adjustable phase and a receiver 204 with an adjustable phase. A phase locked loop 205 provides clock signals derived from the reference clock signals to a phase aligner 206 for the transmitter 203 and a phase aligner 207 for the receiver 204. The phase aligners 206, 207 are adjusted using calibration logic 208. The phase aligner 207 for the receiver 204 also provides a quadrature receive clock on line 212, which is 90 degrees out of phase with the receive clock on line 210. (The quadrature receive clock 212 can be replaced by clocks that are out of phase by a value other than 90 degrees in other embodiments of the invention.) The quadrature receive clock on line 212 is applied to a phase detector 215, which senses the phase of a data signal received from the second component 202 on the communication link 220. The information about the phase of the received data signals is applied to logic 216 and used in cooperation with the calibration logic 208 to adjust the phase of the receive clock on line 210 using the phase aligner 207.

The second component 202 shown in FIG. 2 includes a receiver 221 and a transmitter 222. A phase locked loop 223 supplies a receive clock on line 224 to the receiver 221, and a transmit clock on line 225 to the transmitter 222. The phases of the receive clock on line 224 and the transmit clock on line 225 are typically fixed during operation relative to the reference clock signals from the clock 200. A phase detector 226 is coupled to the communication link 220 and a quadrature receive clock on line 224, which is generated by the phase locked loop 223. (The quadrature receive clock on line 227 can be replaced by clocks that are out of phase by a value other than 90 degrees in other embodiments of the invention.) The phase detector 226 senses information about the phase of signals received on the link 220 from the first component 201, which is accumulated by logic 230. The logic 230 composes a communication packet for a sideband channel 231, that includes the accumulated information about phase of the signals received from the first component 201, as well as an identifier of the channel to which the phase information corresponds. Although only one channel is shown in FIG. 2, in a typical configuration there will be many channels, such as 16 operating in parallel. Thus, the packet composed must provide sufficient information to match the phase information with the appropriate channel. The calibration logic 208 on the first component 201, receives the communication packets, parses the information and applies the information to adjust the phase of the transmit clock 211, using the phase aligner 206. The packets can be used in combination with, or replace, the process of sending and returning calibration patterns as discussed above with reference to FIG. 1.

In one embodiment, the phase detector 226 on the second component produces signals indicating whether the incoming data signals are early or late relative to a reference signal. The early or late information corresponds with up/down information for adjusting the phase of the transmit clock on the first component 201. The logic 230 in one embodiment sends the up/down information from the phase detector to the first component via the sideband channel without processing. In this simple form, each "second component" communicating with the first component 201 would require its own sideband channel.

In an alternative embodiment, the logic 230 on the second component 202 processes the phase detector outputs before sending them to the calibration logic 208 on the first component 201. For example, the logic 230 could average the results across 5 phase samples from a given channel, and then send that average to the first component. Alternatively, the logic 230 could only send up/down information when it receives 5 consecutive outputs of the same polarity (e.g. five "down" outputs from the phase detector). In yet another alternative, the logic 230 could send a result agreeing with a majority of the phase detector outputs (e.g. if 3 of 5 outputs were "up", the logic would send an "up").

If more than one "second component" is connected to the first component 201 via one sideband channel 231, then the logic 230 would have to indicate which device the data being sent is associated with. Alternatively, a command to the "second component" via the standard channels may indicate which device should send its data on the one sideband channel, in a manner similar for example to commands on the Request (RQ) bus using in DRAM integrated circuits.

If information other than phase information is being sent, the logic would again be responsible for creating a packet such that that information can be detected separately from the phase detector information. This "other" information could be information pertaining to controller output settings (amplitude swing, pre-emphasis parameters for equalization, etc).

FIG. 3 illustrates an embodiment of a "second component" according to the present invention. In this embodiment, the "second component" comprises an integrated circuit 300 including high-speed memory. In the illustrated embodiment, the integrated circuit 300 is a DRAM having a DRAM core 301. A bus interface on the integrated circuit 300 includes a plurality of interface circuits 311, 312, 313, . . . , that are coupled to corresponding links 321, 322, 323, . . . , in a plurality of communication channels that comprise a bus. The bus is coupled to a "first component" like that illustrated in FIG. 2 which includes a corresponding plurality of interface circuits. Each of the plurality of interface circuits 311, 312, 313, . . . , on integrated circuit 300 includes a transmitter and a receiver having fixed phases relative to a reference clock as described above. A plurality of sensors 331, 332, 333, . . . , is coupled with corresponding interface circuits on the integrated circuit 300, which senses characteristics of data signals received at the corresponding interface circuits. In the illustrated embodiment, the sensors 331, 332, 333, . . . , consists of phase detectors. In other embodiments, other types of sensors can be utilized. The sensors 331, 332, 333, . . . , are coupled with logic 340 which accumulates the sensed information, and composes packets for communication across the sideband channel to the first component. As mentioned above, in some embodiments, the logic 340 processes the sensed information prior to transmitting it to the first component. The logic 340 in the embodiment of FIG. 3 is coupled with a shared pin driver 341.

The shared pin driver 341 drives the communication packets composed by the logic 340 onto the sideband channel 342 for delivery to the "first component". In one preferred embodiment, the shared pin driver 341 is coupled to the same pin as a scan out port on the integrated circuit, and may share some of the other resources of the scan out port. In some embodiments, a dedicated pin can be used. However, in order to conserve input/output resources on integrated circuit 300, a shared pin is desirable. The shared pin can in various embodiments be shared for control information, test information or system management information purposes. In some embodiments, the sideband channel can be transmitted across a power bus or by a wireless link. The sideband channel in preferred embodiments operates at a frequency relatively low relative to the frequency of the communication channels subject of calibration, such that it operates without calibration, or in a manner in which calibration is less critical.

Figure 4:
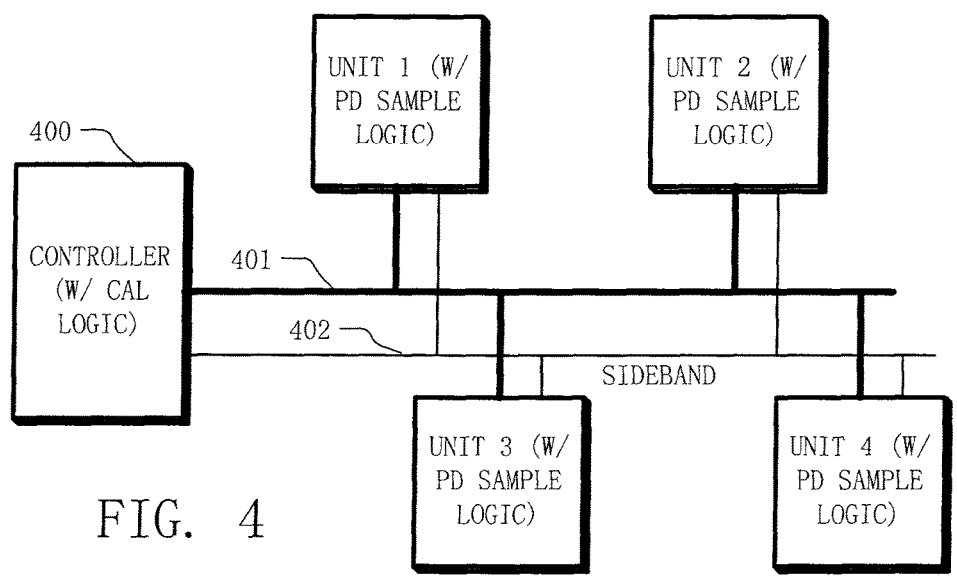
FIG. 4 illustrates a representative embodiment of a system implemented according to the present invention in which one controller communicates with a plurality of units.

FIG. 4 illustrates another configuration of a communication system according to the present invention. The communication system of FIG. 4 includes a controller 400 including calibration logic which is coupled to a plurality of communication channels configured as a shared bus 401. A plurality of units UNIT 1, UNIT 2, UNIT 3, UNIT 4, such as memory devices, are coupled to the bus 401. Each of units UNIT 1, UNIT 2, UNIT 3, UNIT 4, includes sensors such as phase detectors and logic for accumulating information about data signals on the bus 401. A sideband channel 402 is coupled to each of the units UNIT 1, UNIT 2, UNIT 3, UNIT 4, and to the controller 400, by which the information is provided to the calibration logic in the controller 400. In this example, the logic that accumulates information composes packets that identify both the channel and the unit on the bus to which the accumulated information applies.

Figure 5:
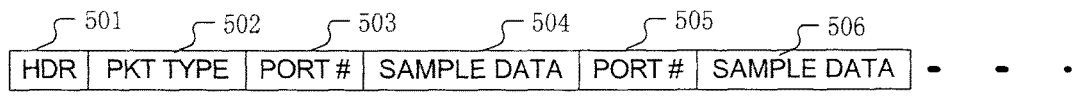
FIG. 5 is a diagram of a packet according to one example protocol according to an embodiment of the present invention.

FIG. 5 illustrates one logical organization for a communication packet 500 which is delivered across a sideband channel according to an embodiment of the invention. The packet includes a header 501 and a packet type field 502. The header 501 and packet type field 502 are parsed by the receiving logic in order to route the information to the appropriate calibration logic. In this example, the packet includes a sequence of sets of data fields, where each set includes an identifier 503, 505, such as a port number, and a sample data field 504, 506, which corresponds with the identified port.

Figure 6:
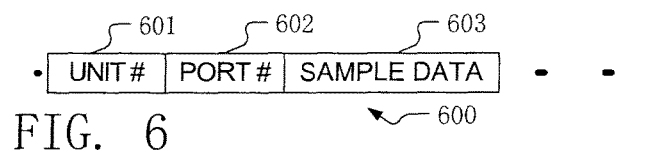
FIG. 6 is a diagram of a packet according to another example protocol according to an embodiment of the present invention.

FIG. 6 illustrates an alternative logical organization for a communication packet. In addition to the header and other control fields (not shown), the packet 600 includes a first identifier 601 for the unit number which corresponds with a device on a shared bus, a second identifier 602 with a port number on the corresponding unit, and a sample data field 603 for each unit/port.

Figure 7:
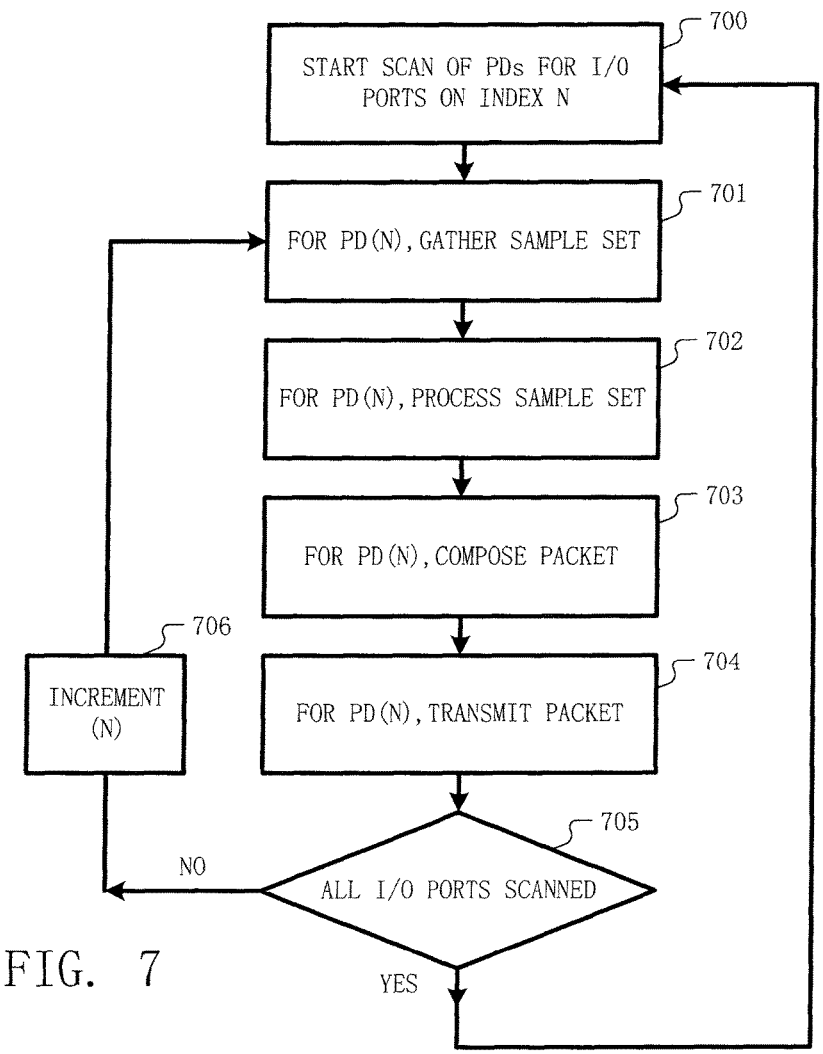
FIG. 7 is a flow chart illustrating a method of operation of the logic on one of the units without calibration logic, according to an embodiment of the present invention.

FIG. 7 illustrates one example of the operation of the logic 230 in the "second component" of FIG. 2, or the logic 340 of FIG. 3, and corresponding logic in other embodiments of the invention. According to the example in FIG. 7, logic 230 starts scanning the phase detectors PD(N) (or other sensors) for corresponding input/output ports at block 700. In the illustrated example, an index N is maintained for the logical flow. For each phase detector PD(N), a sample set is gathered and stored in a local buffer (block 701). Next, the sample set for the phase detector PD(N) is processed according to a majority rule, average, or other algorithm as discussed above (block 702). The processed sample set is used to compose a packet for communication across the sideband channel in block 703. The packet for PD(N) is then transmitted to the first component for use in adjusting the phase of a transmitter (block 704). The logic determines whether all of the I/O ports have been scanned at block 705. If not, then the index "N" is incremented (block 706), and the algorithm loops to block 701 to gather a sample set for a next I/O port. If all the ports have been scanned at block 705, then the algorithm loops to block 700 where it waits for an event (e.g., timeout of a timer) signaling that the scan should be restarted, or immediately begins a new scan.

In other embodiments, the sample sets for all of the phase detectors can be accumulated before they are transmitted. In other embodiments, only sample sets that meet a threshold determination of relevance are transmitted. For example, the sample set relating to an I/O port that suggests that the transmitter at the other end of the channel is properly adjusted, need not be transmitted across the sideband channel.

Figure 8:
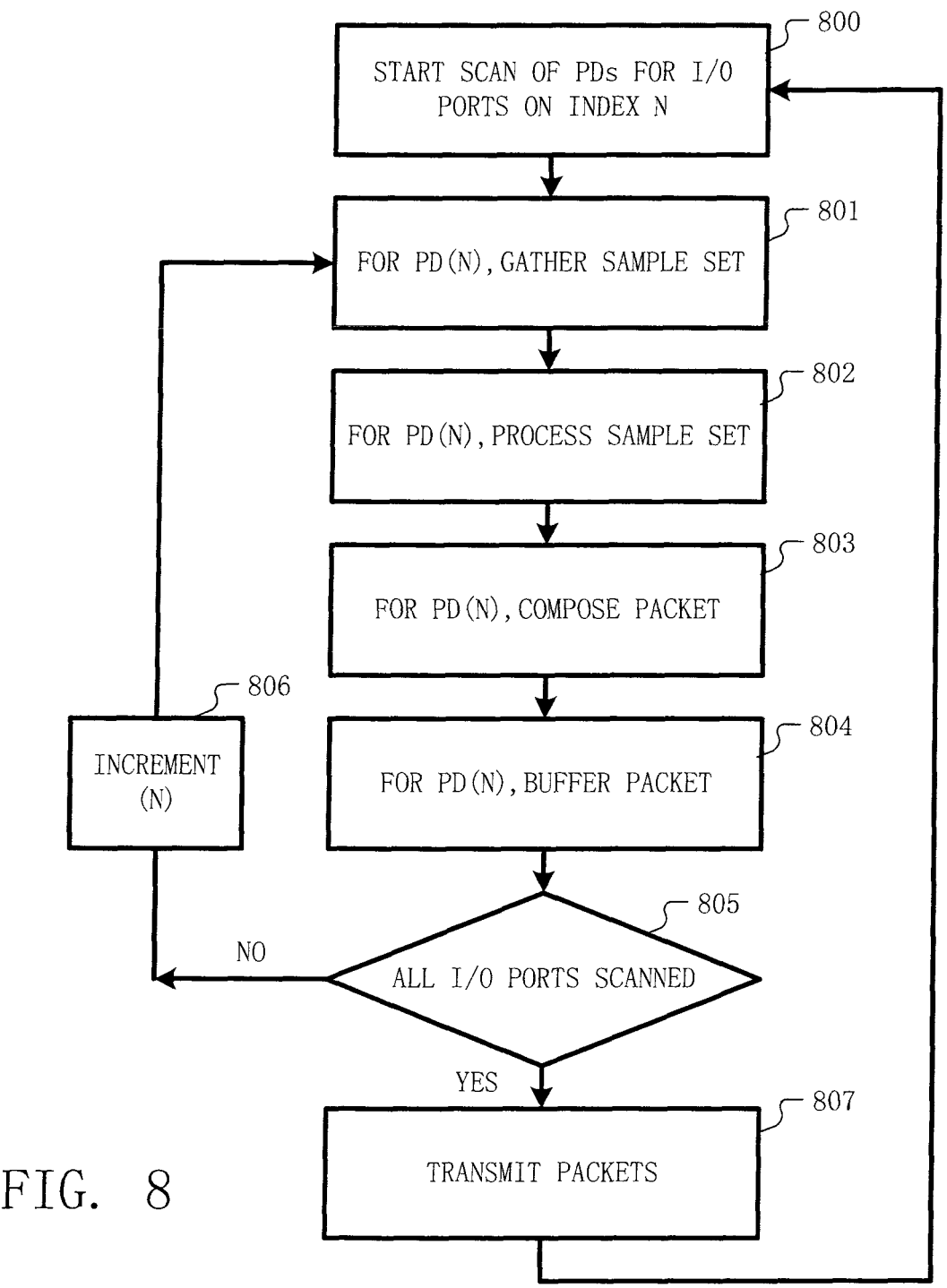
FIG. 8 is a flow chart illustrating an alternative method of operation of the logic on one of the units without calibration logic, according to an embodiment of the present invention.

FIG. 8 illustrates another example of the operation of the logic 230 in "second component" of FIG. 2, or the logic 340 of FIG. 3, and corresponding logic in other embodiments of the invention. In this example, logic 340 starts scanning the phase detectors PD(N) (or other sensors) for corresponding input/output ports at block 800. In the illustrated example, an index N is maintained for the logical flow. For each phase detector PD(N), a sample set is gathered and stored in a local buffer (block 801). Next, the sample set for the phase detector PD(N) is processed according to a majority rule, average, or other algorithm as discussed above (block 802). The processed sample set is used to compose a packet for communication across the sideband channel in block 803. Then the packet for PD(N) is stored in a buffer for later transmission at step 804. The logic determines whether all of the I/O ports have been scanned at block 805. If not, then the index "N" is incremented (block 806), and the algorithm loops to block 801 to gather a sample set for a next I/O port. If all the ports have been scanned at block 805, then the buffered packets are transmitted across the sideband link (block 807). After transmission of the buffered packets, the algorithm loops to block 800 where it waits for an event signaling that the scan should be restarted, or immediately begins a new scan.

Figure 9:
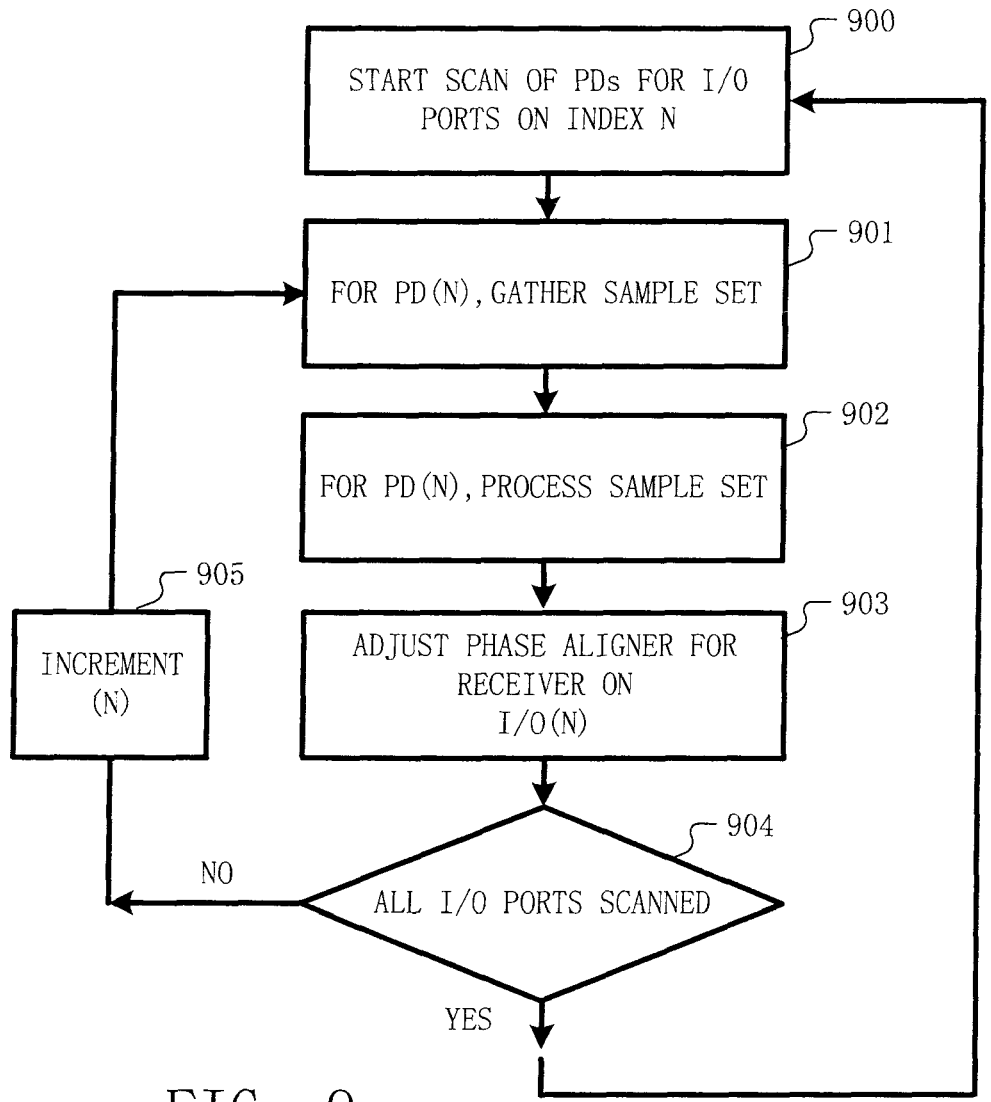
FIG. 9 is a flow chart illustrating a method of operation of the logic on one of the units with calibration logic processing phase detector data from I/O ports on the unit, according to an embodiment of the present invention.

FIG. 9 illustrates one example of the operation of the logic 216, 208 on the "first component" 201 in the system of FIG. 2, and corresponding logic in other embodiments of the invention, by which sensors on the "first component" are used to adjust the adjustable parameters for the receivers on the "first component". According to the illustrated example, the logic starts a scan of the phase detectors for the I/O ports in block 900. For a phase detector on a particular port PD(N), the sample set is gathered (block 901). The sample set for the particular port PD(N) is processed in the next step (block 902). As a result of processing, the phase aligner for the corresponding I/O port is adjusted (block 903). The logic then determines whether all of the I/O ports have been scanned (block 904). If not, then the index N is incremented in block 905, the algorithm loops back to block 901. If all the ports have been scanned at block 904, then the algorithm loops to block 900 to wait for an event causing the scan to restart, or to restart the scan immediately. As discussed above with respect to the logic on the "second component," the order of processing of sample sets, and the timing of the adjustment of the parameters for the receiver on the "first component" can be modified as suits the needs of the particular implementation.

Figure 10:
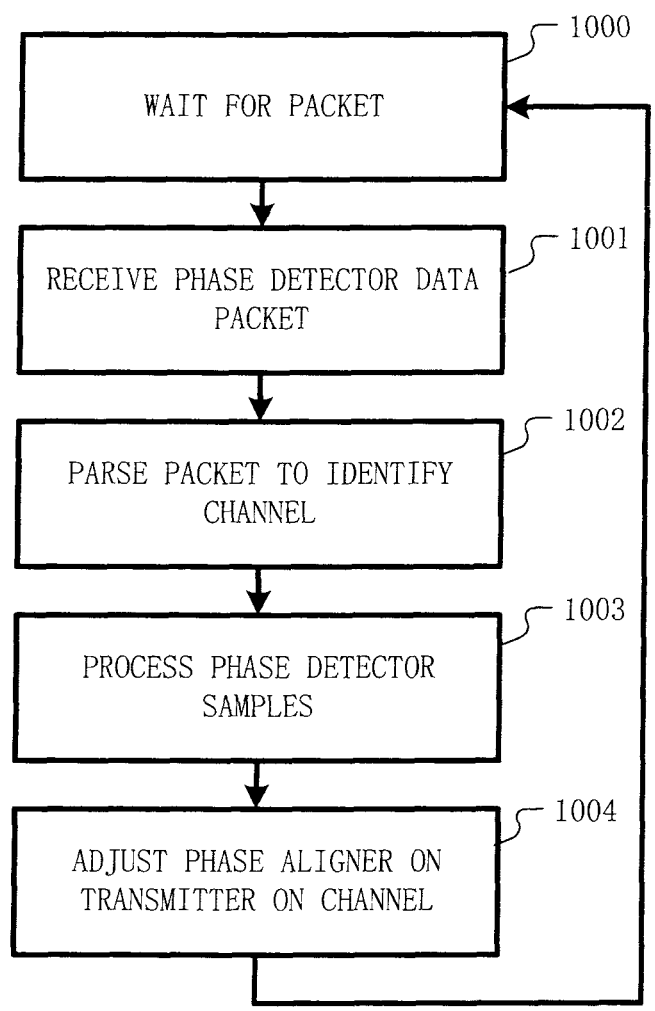
FIG. 10 is a flow chart illustrating a method of operation of the logic on one of the units with calibration logic processing packets from another unit, according to an embodiment of the present invention.

FIG. 10 illustrates one example of the operation of the logic 216, 208 on the "first component" 201 in the system of FIG. 2, and corresponding logic in other embodiments of the invention, by which information from the "second component" is received and processed for the adjustment of adjustable parameters of the transmitters on the "first component" 201. In this example, the process waits for a packet at block 1000. Upon receiving a packet at block 1001, the packet is parsed to identify the channel in the communication system to which the data corresponds (block 1002). In next step, the phase detector samples are processed to determine whether to adjust the parameters of the transmitter associated with that channel (block 1003). Finally, the phase aligner or other circuit which controls an adjustable parameter for the corresponding transmitter is adjusted using the information (block 1004). As discussed above with respect to the logic on the "second component", the order of processing of data from the packets, and the timing of the adjustment of the parameters for the transmitter on the "first component" can be modified as suits the needs of the particular implementation.

Various alternative embodiments of the invention are available. For example, the "second component" could gather and send to the "first component" more than just phase information, including more than one type of sensed data at a time. For example, both amplitude and phase could be gathered. The information could be used for setting the coefficients of an equalizer at the transmitter, such as used for pre-emphasis. Also, other types of communication buses could be utilized than the mesochronous system in the illustrated examples. For example, source synchronous clocking could be utilized in embodiments of the invention. Likewise, for the phase detectors in embodiments that sense phase information, the quadrature clock could be adjustable, and calibrated to initial calibrated phase. The system would then track variations from this initial phase.

In other embodiments, initial calibration of the communication channel could begin with the write path from the "first component" to the "second component." In this manner, the phase information, or other information from the sensors on the second component, is fed back during initial calibration to establish the initial operating values for the adjustable parameters. Using this approach, the second component need not be enabled to transmit calibration patterns back to the first component during the initial calibration process.

The present invention can be adapted to a wide variety of data transmission technologies, including for example RAMBUS Signaling Level RSL signals developed by Rambus, Inc., Los Altos, Calif., as used in RDRAM devices and the like. Also, the present invention can be used to cancel pin-to-pin variation among the communication lines in a bus system.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An integrated circuit (IC) memory chip, comprising:
   memory core circuitry;
   interface circuitry coupled to the memory core circuitry, the interface circuitry including multiple input/output (I/O) ports for coupling to respective data links; and
   calibration circuitry including
      sensor circuitry to detect signal parameter information at each of the I/O ports, the signal parameter information associated with data received at the I/O ports; and
      a sideband I/O port for coupling to a sideband channel, the sideband port to communicate the signal parameter information via the sideband channel to a memory controller.

2. The IC memory chip of claim 1, wherein the memory core circuitry includes dynamic random access memory (DRAM) storage cells.

3. The IC memory chip of claim 1, wherein the multiple I/O ports operate at a first data rate, and the sideband I/O port operates at a second data rate that is less than the first data rate.

4. The IC memory chip of claim 1, wherein the sideband I/O port includes a wired link transmitter.

5. The IC memory chip of claim 4, wherein the sideband I/O port operates in a first mode to communicate the signal parameter information to the memory controller, and in a second mode to communicate second information other than the signal parameter information with the memory controller, the second information from the group comprised of control information, test information, and system management information.

6. The IC memory chip of claim 1, wherein the sideband I/O port includes a wireless transmitter.

7. The IC memory chip of claim 1, wherein the sensor circuitry comprises multiple phase detectors, each of the multiple phase detectors coupled to a respective I/O port to detect phase information of data received at the respective I/O port.

8. The IC memory chip of claim 7, wherein the signal parameter information comprises phase information of data signals relative to a reference clock signal.

9. The IC memory chip of claim 1, further comprising:
logic to accumulate the signal parameter information and to compose a communication packet for transmission to the memory controller, the communication packet including the signal parameter information.

10. A method of operation in an integrated circuit (IC) memory device, the method comprising:
receiving data signals along multiple data links from a memory controller;
generating sensed information associated with the data signals of the multiple data links by
sensing signal parameter information associated with the data signals;
composing the sensed information associated with the data signals of the multiple data links into calibration information; and
transmitting the calibration information to the memory controller via a sideband port.

11. The method of claim 10, wherein generating sensed information comprises generating phase information associated with the data signals relative to a reference clock, the method further comprising:
receiving subsequent data signals having adjusted phase parameters, the adjusted phase parameters based on the calibration information transmitted to the memory controller.

12. The method of claim 10, wherein generating sensed information comprises generating equalization characteristics of the data signals, the method further comprising:
receiving subsequent data signals having adjusted equalization parameters, the adjusted equalization parameters based on the calibration information transmitted to the memory controller.

13. The method of claim 10, wherein the sensed information comprises generating amplitude information associated with the data signals, the method further comprising:
receiving subsequent data signals having adjusted amplitude parameters, the adjusted amplitude parameters based on the calibration information transmitted to the memory controller.

14. The method of claim 10, wherein the transmitting comprises dispatching a communication packet including the sensed information.

15. The method of claim 10, wherein the data signals are received at a first data rate, and wherein the transmitting is carried out at a second data rate that is less than the first data rate.

16. The method of claim 10, further comprising:
sharing the sideband port for communicating second information between the IC memory device and the memory controller, the second information other than the signal parameter information and from the group comprised of control information, test information, and system management information.

17. An integrated circuit (IC) DRAM memory chip comprising:
receiver circuitry for coupling to multiple data links, the receiver circuitry to receive data signals from a memory controller;
sensing circuitry to generate sensed information associated with the data signals of the multiple data links by sensing signal parameter information associated with the data signals;
logic to accumulate the sensed information associated with the data signals of the multiple data links into calibration information; and
transmitter circuitry to transmit the calibration information to the memory controller via a sideband port.

18. The IC DRAM memory chip according to claim 17, wherein the sensing circuitry comprises phase detector circuitry.

19. The IC DRAM memory chip according to claim 18, wherein the signal parameter information comprises phase information of the data signals relative to a reference clock signal.

20. The IC DRAM memory chip according to claim 17, wherein the sideband I/O port operates in a first mode to communicate the signal parameter information to the memory controller, and in a second mode to communicate second information other than the signal parameter information with the memory controller, the second information from the group comprised of control information, test information, and system management information.

* * * * *